Patented Apr. 6, 1926.

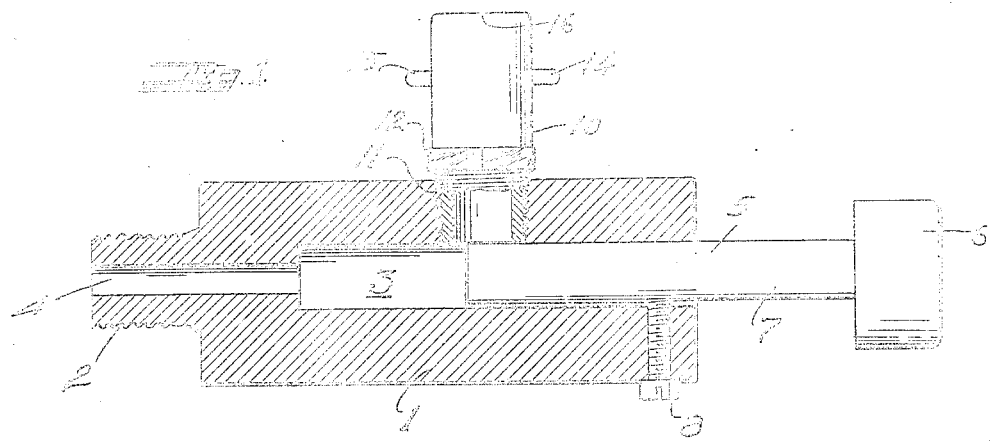

1,579,653

UNITED STATES PATENT OFFICE.

PHILLIP R. DIERINGER, OF SAN FRANCISCO, CALIFORNIA, ASSIGNOR TO MILTON A. FRANK, OF SAN ANSELMO, CALIFORNIA.

BEARING-OBSTRUCTION EJECTOR.

Application filed October 28, 1924. Serial No. 746,324.

*To all whom it may concern:*

Be it known that I, PHILLIP R. DIERINGER, a citizen of the United States, residing at San Francisco, in the county of San Francisco, State of California, have invented a new and useful Bearing-Obstruction Ejector, of which the following is a specification in such full and clear terms as will enable those skilled in the art to construct and use the same.

This invention relates to an apparatus for the purpose of ejecting obstructions from journal bearings, and its object is to provide means whereby a well-known form of pressure pump lubricator may be applied to this device to put on a sufficiently heavy initial pressure to make the operation of this device effective when its plunger is struck a sharp blow with a hammer or mallet.

It will be understood by those skilled in the art that it is common to provide one form or another of high pressure pumps for use in forcing grease into various types of machine journal bearings. These lubricating pumps are especially used in connection with automobiles and other machines where the journal bearings become filled with mud and dirt, however, such bearings frequently become so stopped up that it takes an enormously high pressure to drive out the dirt or other matter that may be the cause of stoppage in the bearing, and this high pressure cannot be attained with any ordinary form of screw feed or force feed, but in practice can be attained only by using a very small plunger and striking the plunger with a hammer or mallet, that being the method of increasing the pressure of the lubricant within the bearing after an initial pressure has been put upon it with one of the ordinary forms of pressure grease guns.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a longitudinal sectional view through the ejector.

Fig. 2 is an end view of the ejector looking from the right of Fig. 1.

The numeral 1 indicates a short piece of steel which has a nipple 2 turned and threaded on one end. A small hole 3 is bored in the member 1 and a hole 4 extends from the bottom of the hole 3 through the nipple 2. Slidable in the hole 3 is a plunger 5 with a striking head 6. This plunger is flattened at 7 and the member 1 has a set screw 8 which prevents the plunger 5 from being ejected from the member 1 under the high pressure applied to the lubricant by the grease gun.

Secured in the side of the member 1 is a well-known form of lubricator fitting 10 which has a threaded nipple 11, a hexagonal portion 12 for securing it into the member 1, two pins 13 and 14 for securing the grease gun fitting thereto and said member also has a ball-check 16 for preventing the grease from escaping therefrom.

In operation the ordinary form of grease gun is used wherever the bearings are sufficiently loose to allow the grease to be forced therefrom into the bearings. If there is a bearing that is so tight with dirt or rust that the ordinary grease gun cannot be used to force the grease thereinto the common fitting, which is substantially like the fitting 10, is removed from the journal and the nipple 2 is screwed thereinto in place of that fitting. The grease gun then has its connecting fitting applied to the member 10 and grease is forced into the chamber 3 as tightly as possible.

This ejects the plunger 5 to the position shown in Fig. 1, and as soon as this is done, a sharp blow is struck upon the head 6 which places such a high pressure upon the grease within the bearing and chamber 3 as to be capable of forcing any obstruction out of the bearing.

It will be seen that the head 6 strikes the end of the member 1 before the end of the rod 5 touches the bottom of the lubricant chamber to prevent injury to said small rod.

What I claim is as follows, but modifications may be made in carrying out the invention shown in the drawings and in the above particularly described form thereof, within the purview of the invention as defined by the annexed claims:

1. A bearing obstruction ejector, comprising an elongated member having a hole extending longitudinally therethrough, a plunger extending into said member and provided with a striking head, a set screw for limiting the movement of said plunger and a fitting applied to said member to permit the forcing of a lubricant into the first member under a comparatively high pressure.

2. A bearing obstruction ejector comprising an elongated member having a hole extending longitudinally therethrough, means to connect said member to a lubricating device at one end, a plunger extending into said member having a striking head, means to limit the movement of said plunger, and a fitting applied to said member to permit lubricant to be forced into it from a suitable grease gun, the plunger being arranged to cut off the opening to said lubricant supply with a very slight forward movement whereby the high pressure developed when the plunger is struck will not affect the lubricant fitting.

In testimony whereof I have hereunto set my hand this 17th day of April, A. D. 1924.

PHILLIP R. DIERINGER.